United States Patent [19]

Johnson

[11] 4,164,342

[45] Aug. 14, 1979

[54] VARIABLE DIFFERENTIAL PRESSURE UNLOADING VALVE APPARATUS

[75] Inventor: Charles E. Johnson, Santa Ana, Calif.

[73] Assignee: Double A Products Company, Manchester, Mich.

[21] Appl. No.: 882,598

[22] Filed: Mar. 2, 1978

Related U.S. Application Data

[62] Division of Ser. No. 752,103, Dec. 20, 1976, Pat. No. 4,114,637.

[51] Int. Cl.² .................... G05D 16/10; F16K 31/122
[52] U.S. Cl. .................................................... 251/28
[58] Field of Search ............... 137/115, 489, 491, 116, 137/118; 60/418; 251/29, 28

[56] References Cited

U.S. PATENT DOCUMENTS 2,393,571  1/1946  Schultz ........................... 251/29 X Primary Examiner—Arnold Rosenthal
Attorney, Agent, or Firm—Olsen and Stephenson

[57] ABSTRACT

Variable differential pressure control apparatus is used in a hydraulic system including a pump, an accumulator for receiving hydraulic fluid under pressure from the pump and for discharging hydraulic fluid to a work device, and an unloading valve in the circuit between the pump and the accumulator for regulating pressure of the fluid to the accumulator. The control apparatus is connected with the unloading valve for opening and closing the latter and is adjustable (1) for selectively setting the maximum fluid pressure to the accumulator and (2) for selectively setting the variation between the maximum pressure to the accumulator, at which pressure the unloading valve will open, and the minimum pressure to the accumulator at which pressure the unloading valve will close for recharging the accumulator.

3 Claims, 5 Drawing Figures

VARIABLE DIFFERENTIAL PRESSURE UNLOADING VALVE APPARATUS

REFERENCE TO PENDING APPLICATION

This application is a division of pending application Ser. No. 752,103, filed Dec. 20, 1976, in the name of Charles E. Johnson for "Variable Differential Pressure Unloading Valve Apparatus" now U.S. Pat. No. 4,114,637, dated Sept. 19, 1978.

BACKGROUND OF THE INVENTION

The present invention relates to a variable differential pressure control apparatus for a hydraulic system for selectively setting the hydraulic fluid pressure supplied to an accumulator or similar device, and for selectively setting the pressure differential between the upper and lower limits of pressure in the accumulator or similar device.

It is conventional practice to employ an unloading valve in the hydraulic circuit between an hydraulic pump and an accumulator for unloading the circuit when a selected maximum pressure has been reached in the accumulator. Likewise, it is known to employ control means so that the accumulator will automatically be recharged to its maximum pressure when the pressure in the accumulator has reached a preselected lower limit. However, the prior art has failed to provide suitable apparatus which will enable an operator of the hydraulic system to vary selectively the differential pressure to the accumulator in a simple and effective manner.

SUMMARY OF THE INVENTION

The present invention has overcome the inadequacies of the prior art and provides control apparatus whereby the operator of the hydraulic system can readily set the upper and lower limits of the pressure of fluid supplied to an accumulator.

According to one form of the present invention, a variable differential pressure control apparatus is provided for use in a hydraulic system having a hydraulic pump, and accumulator for receiving hydraulic fluid from the pump and for delivering hydraulic fluid between upper and lower pressure limits to a work station, a tank for receiving hydraulic fluid, and a normally closed valve means having a primary port connected to the pump, a secondary port connected to the tank, and a poppet for blocking flow from the primary port to the secondary port until a pre-established pressure differential across a high pressure side and a lower pressure side of the poppet acts to move the poppet to a position to open communication between the primary and secondary ports. The control apparatus subsequentially functions to close the poppet when a selected lower pressure in the accumulator occurs.

The variable differential pressure control apparatus includes a normally closet upper-limit differential pressure valve means defining a passageway for communication with the tank and the lower pressure side of the poppet, and an adjustable spring and associated valve member in the passageway spring-actuated by the spring to a normal position for blocking communication from the lower pressure side to the tank, and movable in response to a preselected pressure against its spring-action to an open position for venting said lower pressure side of the poppet so as to allow the poppet to move to its open position. A balancing means is operatively connected with the valve member and is responsive to a pressure differential to bias the valve member against its spring-action to its open position. The balancing means is in communication with a pilot circuit adapted to be connected to the accumulator as one source of pressure acting in one direction on the balancing means.

A lower-limit differential pressure valve means is provided which is ported for communication with the lower pressure side of the poppet, with the pilot circuit and with the balancing means so as to provide a second source of pressure for acting in the other direction on the balancing means. A spring and an associated spool are provided, wherein the spool is spring-actuated by the spring to a normal position for blocking the port leading to the lower pressure side of the poppet, while allowing communication between the pilot circuit port and the balancing means so that the pressures acting on the balancing means from the upper and lower-limit valve means are balanced. Under these conditions the poppet will remain closed.

The spool and its associated spring are further operable in response to a preselected higher pressure differential between the pilot circuit and the spring-action of the lower-limit valve means to move the spool against the spring-action to block communication between the pilot circuit and the balancing means and to allow communication between the ports associated with the lower limit pressure side of the poppet and the balancing means. Initially, a limited pressure drop will then occur in the second source of pressure because of leakage through the valve member to tank, thereby causing the balancing means to urge the valve member further open. The further opening of the valve member will now cause venting of the poppet and the second source of pressure to the balancing means is reduced substantially as the lower pressure side of the poppet is vented, thereby allowing said balancing means to respond to the pressure acting on it in said one direction, or from the pilot circuit side, to hold said valve member open until such time when the pressures acting on the balancing means are again balanced. The spring characteristics of the spring-actuated valve member and the spring-actuated spool are such that the valve member will open when the upper allowable limit of pressure from the pump to the accumulator is reached and so that the spool will return to its normal position when the pressure from the accumulator via the pilot circuit has decreased to the lower allowable limit at which time the spool will return to its original position resulting in the pressures acting on said balancing means again to become balanced and to terminate the venting of the lower pressure side of the poppet so that it closes. The accumulator will then be charged again by the pump until the upper limit of pressure is again reached when the cycle will repeat. The upper and lower pressures can selectively be set by adjusting the settings of the springs associated with the valve member and the spool.

Thus, it is an object of the present invention to provide improved variable differential pressure unloading valve apparatus.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 5 is a fragmentary section taken on the lines 5—5 of FIG. 3.

DESCRIPTION OF THE PREFERRED EMBODIMENT

Figure 1:
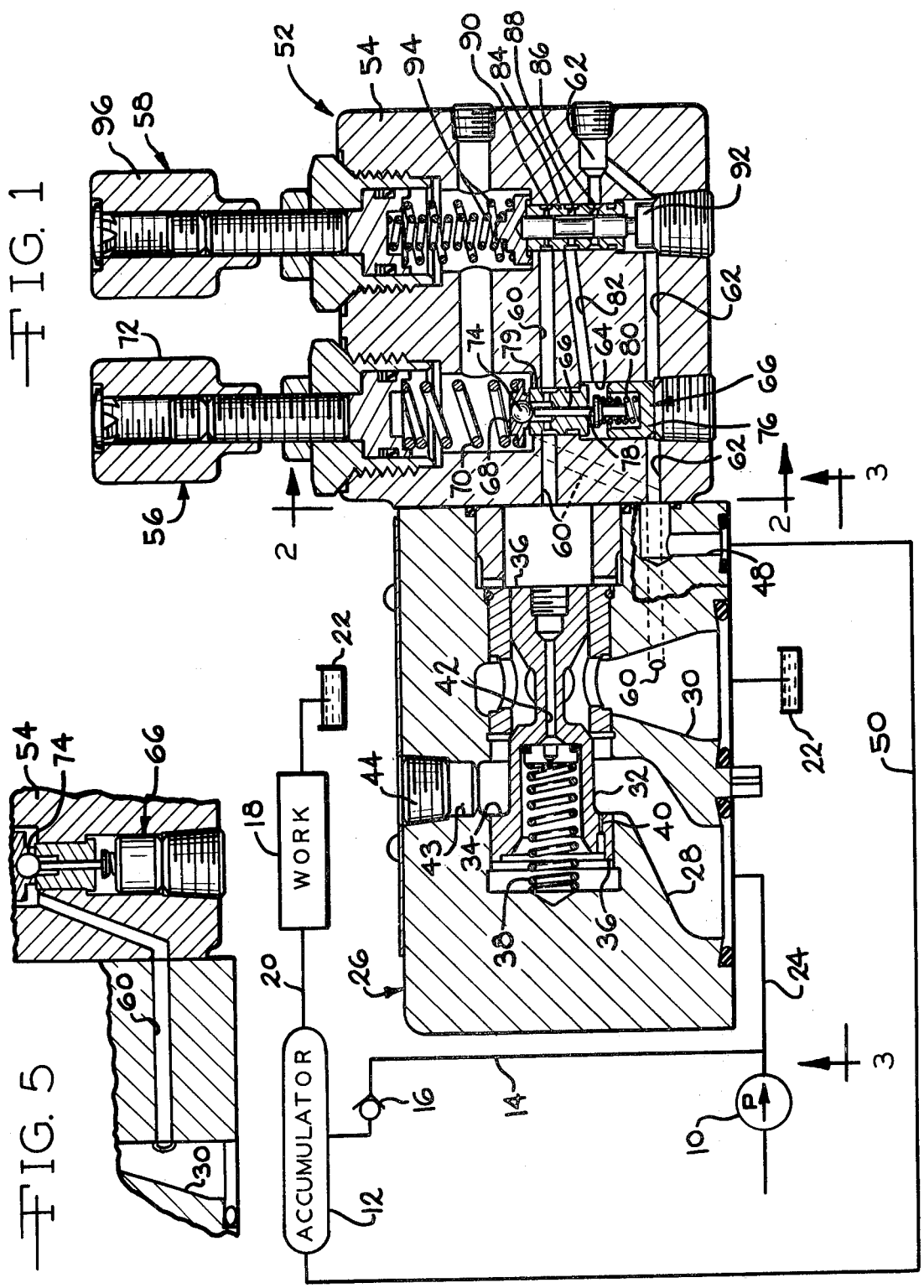
FIG. 1 is a schematic diagram of the hydraulic system and showing the variable differential pressure control apparatus in cross section.
Figure 2:
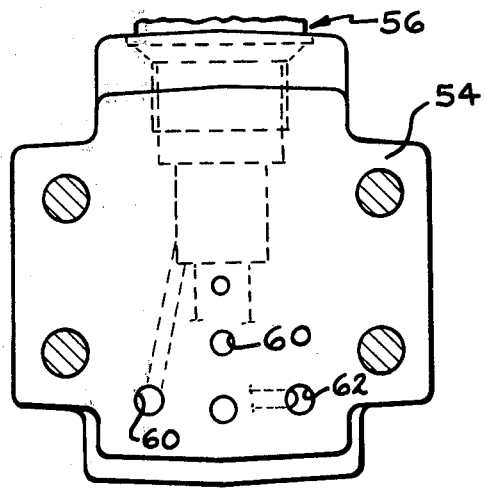
FIG. 2 is a section taken on the lines 2—2 of FIG. 1.
Figure 3:
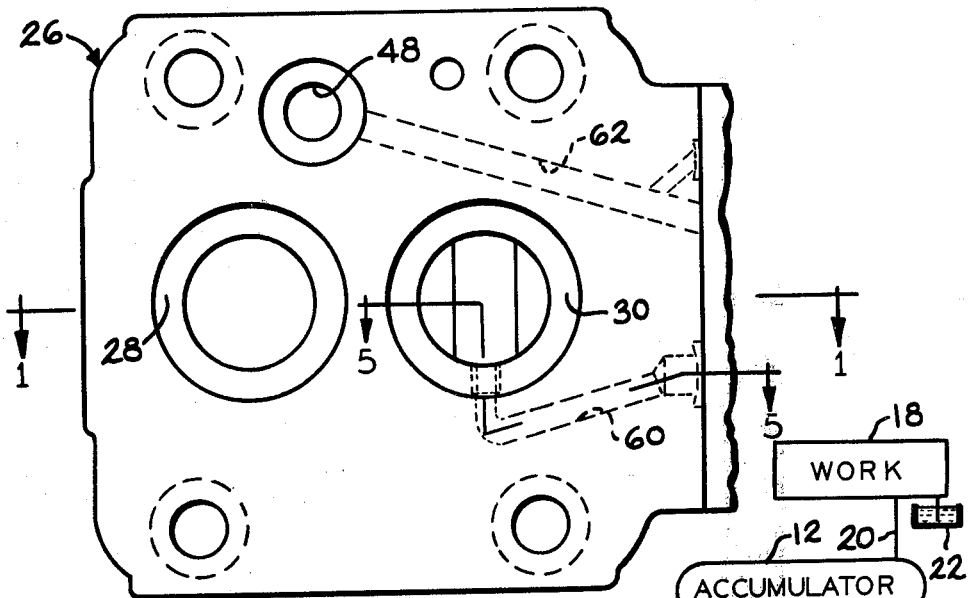
FIG. 3 is a bottom plan view taken on the lines 3—3 of FIG. 1.
Figure 4:
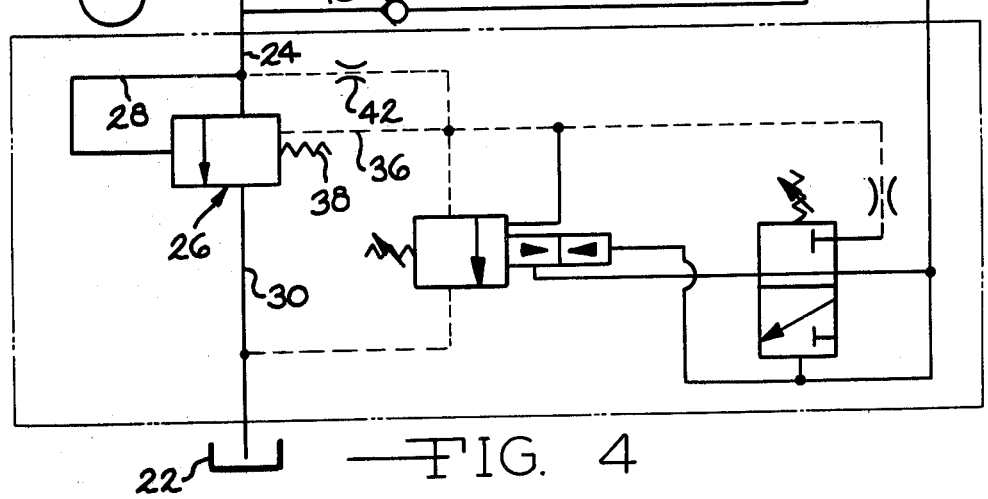
FIG. 4 is a schematic diagram of the hydraulic circuits in the embodiment of the invention illustrated in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The present invention will be described with respect to one hydraulic system in which it may be used, but it will be readily understood that the invention is not restricted to use in the specific hydraulic system illustrated and described. The illustrated hydraulic system includes a hydraulic pump 10 which may serve as a primary supply source of hydraulic fluid, an accumulator 12 to which hydraulic fluid under pressure can be supplied via the conduit 14 and check valve 16, and from which hydraulic fluid under pressure can be discharged to a work station 18 via conduit 20 for use and return to tank 22. The pump 10 is also in communication via the conduit 24 with the normally closed valve means 26. The latter has a primary port 28 connected to the conduit 24 and a secondary port 30 connected to tank 22. A poppet 32 is provided in the valve means 26 for blocking flow from the primary port to the secondary port until a pre-established pressure differential across the high pressure side 34 and the lower pressure side 36 is such as to overcome the spring pressure of the spring 38 to move the poppet to a position to open communication between the primary port 28 and the secondary port 30. The valve means 26 is conventional in construction and includes a restricted flow passage 40 and an additional flow passage 42 through the poppet 32 for restricted flow of hydraulic fluid from the high pressure side to the lower pressure side of the poppet 32. When the poppet 32 is in its open position hydraulic fluid from pump 10 will be vented to tank 22, and therefore, fluid under pressure to accumulator 12 via conduit 14 and check valve 16 will be interrupted. If desired, plug 44 can be removed and conduit 14 connected to discharge port 46 instead of to conduit 24, as shown, without departing from the described operation. As indicated, the portions of valve means 26 described above, are known.

The valve means 26 also has a pilot port 48 connected to a conduit 50 which leads to accumulator 12 to provide pilot pressure to the valve means 26.

Mounted on the normally closed valve means 26 is the variable differential pressure control apparatus 52 which has a valve body 54 in which is mounted a normally closed upper limit differential pressure valve means 56 and a lower limit differential pressure valve means 58. The valve body 54 has a first passageway 60 which is open at its upstream end to the lower pressure side 36 of the poppet 32 and extends through the normally closed upper limit differential pressure valve means 56 to the secondary port 30 for discharge to tank 22. A branch of the passageway 60 also extends to the lower limit differential pressure valve means 58 as well presently be described. A second or pilot passageway is in communication with the pilot port 48 for receiving hydraulic fluid under pressure from the pilot source or accumulator 12, and the second passageway 62 also extends to the lower limit differential pressure valve means 58. A balancing chamber 64 is located adjacent to the first passageway 60 and is in communication at one end with the second passageway 62. The other end of the balancing chamber 64 has a wall 66 closing communication with the first passageway 60 and a balancing means 66 is located within the chamber 64 and is operably connected with a valve member 68 that extends across passageway 60 and normally blocks the passageway. The valve member 68 is an element of the normally closed upper limit differential pressure valve means 56 and is urged to its closed position by the action of the compression spring 70. The differential pressure valve means 56 has a control knob or adjustment means 72 which can be turned to vary selectively the pressure of the spring 70. The valve member 68 includes the ball 74 which normally closes the passageway 60 and is engaged by the balancing means 66.

The balancing means 66 includes the balancing piston 76, the pin 78 that extends through the wall 79 and is slideable therein, and the compression spring 80 which functions to transmit motion of the piston 76 to the pin 78.

A third passageway 82 is in communication under certain conditions at its one end with the first passageway 60 and is in communication under other conditions at its other end with the balancing chamber 64. The communication between the first passageway 60 and the third passageway 82 is normally blocked by the lower limit differential pressure valve means 58, and the communication between the second passageway 62 and the third passageway 82 is normally permitted through the lower limit differential pressure valve means 58.

The lower limit differential pressure valve means 58 includes the sleeve 84 which is ported at 86 for communication with the second passageway 62, is ported at 88 for communication with the third passageway 82, and is ported at 90 for communication with the first passageway 60. Within the sleeve 84 is the spool 92 which is normally urged to the position shown in FIG. 1 by the action of the two compression springs 94 whose compression can be selectively set by turning of the control knob 96. The spool 92 is responsive to the pressure of the pilot fluid in the pilot or second passageway 62 to move against the biasing action of the compression springs 94.

When the lower limit differential pressure valve means 58 is in the position shown in FIG. 1, the pressure of the pilot fluid in the passageway 62 will extend through the valve means 58 via the ports 86 and 88 to the balancing chamber 64 so that the pressure from the pilot fluid acting on the opposite ends of the piston 76 of the balancing means 66 will be equal. Under these conditions, the balancing means 66 will not exert any pressure against the valve member 68.

When the pressure conditions are such that the pilot fluid acting against the spool 92 causes the latter to move against the action of the springs 94, the spool will interrupt communication between the second and third passageways 62 and 82, and will allow communication between the first passageway 60 and the third passageway 82. Thus, the end of the balancing chamber adjacent to the valve member 68 will then be exposed to the pressure from the lower pressure side of the poppet 32.

In the operation of the hydraulic system, the pump 10 will initially pump hydraulic fluid via conduit 14 and check valve 16 to the accumulator 12, and at this time the poppet 32 will be in its closed position. When the pressure in the accumulator 12 has reached the desired upper limit, this pressure will be present in the first passageway 60 by virtue of the pressure from the pump 10 via the conduit 24, primary port 28, and restricted passages 40 and 42 in the poppet 32. Because of the setting of the control knob 72, the pressure acting on the ball 74 of the valve member 68 will now begin to leak to allow a limited pressure drop because of discharge flow to tank 22 via the secondary port 30. While this is occurring, the pilot pressure in secondary passageway 62 from the pilot line 50 will also be exerting a pressure sufficient to cause the spool 92 to act against the spring pressure of the compression springs 94 thereby closing communication between the second passageway 62 and the third passageway 82 and opening communication between the first passageway 60 and the second passageway 82 so that the one end of the chamber 64 is now subjected to the reduced pressure from passageway 60. Under these conditions, the higher pressure from the pilot source acting on the one end of the piston 76 will cause the piston to move in the direction of the valve member 68 completely unseating the valve member 68, thereby venting the lower pressure side of poppet 32 causing the latter to move to the open position. The pump 10 will then discharge hydraulic fluid directly through the normally closed valve means 26 to tank and no further charging of the accumulator 12 will occur.

When hydraulic fluid is discharged from the accumulator 12 to the work 18, the pressure drop will eventually be such as to permit the compression springs 94 of the valve means 58 to move the spool 92 back to its original position shown in FIG. 1, and the balancing piston 76 will then again be subjected on both of the ends of piston 76 to the pressure of the pilot fluid. When in this balanced position, it no longer will exert pressure against the valve member 68 and the latter will again move to its normally closed position in response to the action of the compression spring 70. This in turn, will have the effect of permitting the poppet to assume its normally closed position and the cycle of recharging the accumulator 12 will occur. Thus, the operator can readily set the upper and lower limits of pressure in accumulator 12 merely by setting the control knobs 72 and 96 to desired positions of regulation of the spring pressures for the springs 70 and 94. By virtue of the described apparatus the upper limit, the lower limit and the differential pressure for the accumulator 12 can be obtained.

It is claimed:

1. A differential pressure control apparatus comprising a valve body having a first passageway for receiving hydraulic fluid under pressure from a primary source for discharge to tank, a normally closed first spring-actuated valve member in said first passageway spring biased to a closed position to block communication from the primary source to tank and responsive to a preselected pressure acting against its spring action to move to an open position to vent said passageway to tank, a second passageway for receiving hydraulic fluid under pressure from a pilot source, a balancing chamber adjacent to said first passageway in communication with said second passageway and containing a balancing piston operably connected to said first valve member and movable between a first position when said first valve member is closed and a second position when the piston in response to pressure from said pilot source and in cooperation with pressurized fluid from said primary source urges said first valve member to its open position, a third passageway in communication with said first passageway upstream from said first valve member and communicating with said balancing chamber on the side of said balancing piston opposite from the communication of the balancing chamber with said second passageway, a valve chamber providing said communication between said first and said third passageways and communication between said second and said third passageways, and a second spring-actuated valve member in a first position in said valve chamber normally closing communication between said first and third passageways and allowing communication between said second and third passageways and responsive to a preselected pressure in said second passageway acting against the spring-action of said second valve member to move to a second position closing communication between said second and third passageways and allowing communication between said first and third passageways.

2. The differential pressure control apparatus that is defined in claim 1, wherein the spring pressures of said first and said second spring-actuated members are selectively variable.

3. The differential pressure control apparatus that is defined in claim 1, wherein said balancing piston is operably connected to said first valve member by a pin extending through the end wall of the balancing chamber into engagement with said valve member, said pin being slidable relative to said end wall, and a spring disposed between said pin and said balancing piston through which axial movement of said balancing piston is transmitted to said pin.

* * * * *